United States Patent
Lee et al.

(10) Patent No.: US 10,791,039 B2
(45) Date of Patent: Sep. 29, 2020

(54) SYSTEMS AND METHODS FOR CLOUD SERVICE PROVISIONING USING SOFTWARE CONTAINERS

(71) Applicant: Quanta Computer Inc., Taoyuan (TW)

(72) Inventors: Chen-Chung Lee, Taoyuan (TW); Chun-Hung Chen, Taoyuan (TW); Chien-Kuo Hung, Taoyuan (TW); Wen-Kuang Chen, Taoyuan (TW); En-Chi Lee, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 71 days.

(21) Appl. No.: 16/211,363

(22) Filed: Dec. 6, 2018

(65) Prior Publication Data
US 2020/0044945 A1  Feb. 6, 2020

(30) Foreign Application Priority Data
Aug. 3, 2018 (TW) .............................. 107127089 A

(51) Int. Cl.
G06F 15/16 (2006.01)
H04L 12/24 (2006.01)
H04L 29/08 (2006.01)

(52) U.S. Cl.
CPC .......... *H04L 41/5041* (2013.01); *H04L 67/10* (2013.01)

(58) Field of Classification Search
USPC ........................................................ 709/219
See application file for complete search history.

(56) References Cited

U.S. PATENT DOCUMENTS

| | | | | |
|---|---|---|---|---|
| 8,196,136 B2 * | 6/2012 | Sonkin | ...................... | G06F 8/60 717/176 |
| 8,359,645 B2 * | 1/2013 | Kramer | ................... | G06F 21/56 726/22 |
| 8,832,162 B2 * | 9/2014 | Greenspan | .............. | G06F 16/18 707/825 |
| 8,938,706 B2 * | 1/2015 | Das | ....................... | G06F 11/323 717/101 |
| 9,075,638 B2 * | 7/2015 | Barnett | ................... | G06F 9/455 |

(Continued)

FOREIGN PATENT DOCUMENTS

CN  105893205 A  8/2016
CN  108021608 A  5/2018

OTHER PUBLICATIONS

Chinese language office action dated Apr. 24, 2019, issued in application No. TW 107127089.

*Primary Examiner* — Alicia Baturay
(74) *Attorney, Agent, or Firm* — McClure, Qualey & Rodack, LLP

(57) ABSTRACT

A cloud service system includes a hardware resource, a storage device, and a controller. The hardware resource is installed with a system, and a software container is instantiated for cloud service execution on the hardware resource. The storage device stores a plurality of libraries, each of which is associated with a respective version of the system. The controller determines a first version of the system according to a deployment request, determines whether one of the libraries is associated with the first version, and selects one of the libraries for instantiating the software container according to a selection history of the libraries in response to none of the libraries being associated with the first version.

8 Claims, 5 Drawing Sheets

(56) References Cited

U.S. PATENT DOCUMENTS

| | | | |
|---|---|---|---|
| 9,262,470 B1* | 2/2016 | Evans | G06F 16/738 |
| 9,519,468 B2* | 12/2016 | Goetz | G06F 9/44536 |
| 9,823,915 B1* | 11/2017 | Maloney | G06F 8/71 |
| 9,916,233 B1* | 3/2018 | Qureshi | G06F 9/45533 |
| 10,031,735 B2* | 7/2018 | Baset | G06F 21/6218 |
| 10,402,187 B2* | 9/2019 | Turovsky | G06F 8/65 |
| 10,592,315 B2* | 3/2020 | Yu | G06F 9/546 |
| 10,650,138 B2* | 5/2020 | D'Errico | G06F 16/245 |
| 2006/0218528 A1* | 9/2006 | Lerner | G06F 8/60 717/120 |
| 2009/0100158 A1* | 4/2009 | Sonkin | H04L 41/0856 709/221 |
| 2018/0218148 A1 | 8/2018 | D'Errico et al. | |
| 2019/0222988 A1* | 7/2019 | Maes | H04L 41/5035 |

* cited by examiner

SYSTEMS AND METHODS FOR CLOUD SERVICE PROVISIONING USING SOFTWARE CONTAINERS

CROSS REFERENCE TO RELATED APPLICATIONS

This application claims priority of Taiwan Application No. 107127089, filed on Aug. 3, 2018, the entirety of which is incorporated by reference herein.

BACKGROUND OF THE APPLICATION

Field of the Application

The application relates generally to cloud service technologies, and more particularly, to systems and methods for cloud service provisioning using software containers.

Description of the Related Art

With the rapid development of networking technologies, the concept of cloud computing has been proposed and realized by using ubiquitous networks to integrate distributed computing devices on the Internet to provide various resources and services. For example, a user may operate on a desktop computer, a notebook Personal Computer (PC), a panel PC, a smartphone, or any computing device with a wired/wireless communication function, to access e-mails maintained by a remote server, or to send a data processing task to be carried out by a remote server. In addition, with network connections, a remote server may serve as a cloud server to provide functions of data backup and access, and/or cloud computing. The key for cloud service provisioning is the virtualization technology, such as the Virtual Machine (VM) technology, and the software container technology.

Using the VM technology as an example, the cloud applications are applications running on the VMs hosted by the cloud server to provide cloud services, and they are usually published by the development team and then handed over to the operation team to be deployed on the VMs for cloud service execution.

The cloud service deployment process can be quite complicated sometimes and constant updates will be required for various reasons. For example, the cloud service deployment process may include setting up hosts (e.g., computers), setting up VMs, configuring a database, configuring network equipment, etc. The reasons for updates may include: a new VM is added and management of the new VM is required; deployments of different operating systems emulated by multiple VMs should be customized; the grammar in different database versions may be different; and the configuration process of the software/hardware of the network equipment may change after a software/hardware update.

Conventionally, the development team (also called Dev) and the operation team (also called Ops) work independently during the cloud service deployment process, and this independent manner of working may introduce inefficiencies in cloud service deployment. In order to improve the efficiency of cloud service deployment, the concept of "DevOps" has been proposed, which is aimed at unifying the development team and the operation team by incorporating their respective work flows, to realize shorter development cycles, an increased deployment frequency, and more dependable releases.

On the other hand, the software containers are lightweight when compared to VMs, and thus, the cloud services they provide are often called microservices. In addition to features such as better performance and less memory utilization, the software containers may realize unification of cloud service deployment to increase the deployment frequency and make subsequent updates easier. Therefore, the software container technology is commonly used to satisfy the requirements of DevOps.

However, due to the inevitable need for constant updates, problems may occur in cloud service provisioning under the DevOps infrastructure. For example, after the operation team updates the software/hardware of a host, the cloud service run on the host may malfunction if the cloud service does not support the updated version of the host's software/hardware. More seriously, the malfunctioning of the cloud service may violate the Service Level Agreement (SLA) and damage the business reputation of the cloud service operator. In another example, the deployment of a new cloud service may require updates of the software/hardware of a host, but the updates of the host's software/hardware and building a test environment will cause a delay in cloud service provisioning. In yet another example, the entire management system needs to be updated as long as either the software or hardware of a host is updated, and such constant updates will increase the loading of the operation team. In still another example, kernel development for each version of the software/hardware of a host is an essential task of the development team, and the updates of the host's software/hardware will increase the loading of the development team, even if the configuration process for the host's software/hardware hasn't changed or has changed only a little after the updates.

BRIEF SUMMARY OF THE APPLICATION

In order to solve the aforementioned problems, the present application proposes systems and methods for cloud service provisioning using software containers.

In one aspect of the application, a cloud service system comprising a hardware resource, a storage device, and a controller is provided. The hardware resource is installed with a system, wherein a software container is instantiated for cloud service execution on the hardware resource. The storage device is configured to store a plurality of libraries, each of which is associated with a respective version of the system. The controller is configured to determine a first version of the system according to a deployment request, determine whether one of the libraries is associated with the first version, and select one of the libraries for instantiating the software container according to a selection history of the libraries in response to none of the libraries being associated with the first version.

In another aspect of the application, a method for cloud service provisioning using software containers, executed by a cloud service system, is provided. The method comprises the steps of: providing a hardware resource installed with a system, wherein a software container is instantiated for cloud service execution on the hardware resource; determining a first version of the system according to a deployment request; determining whether one of a plurality of libraries is associated with the first version; and selecting one of the libraries for instantiating the software container according to a selection history of the libraries in response to none of the libraries being associated with the first version.

Other aspects and features of the application will become apparent to those with ordinary skill in the art upon review of the following descriptions of specific embodiments of the cloud service systems and methods for cloud service provisioning using software containers.

BRIEF DESCRIPTION OF THE DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the terms "comprises," "comprising," "includes" and "including," when used herein, specify the presence of stated features, integers, steps, operations, elements, and/or components, but do not preclude the presence or addition of one or more other features, integers, steps, operations, elements, components, and/or groups thereof.

Figure 1:
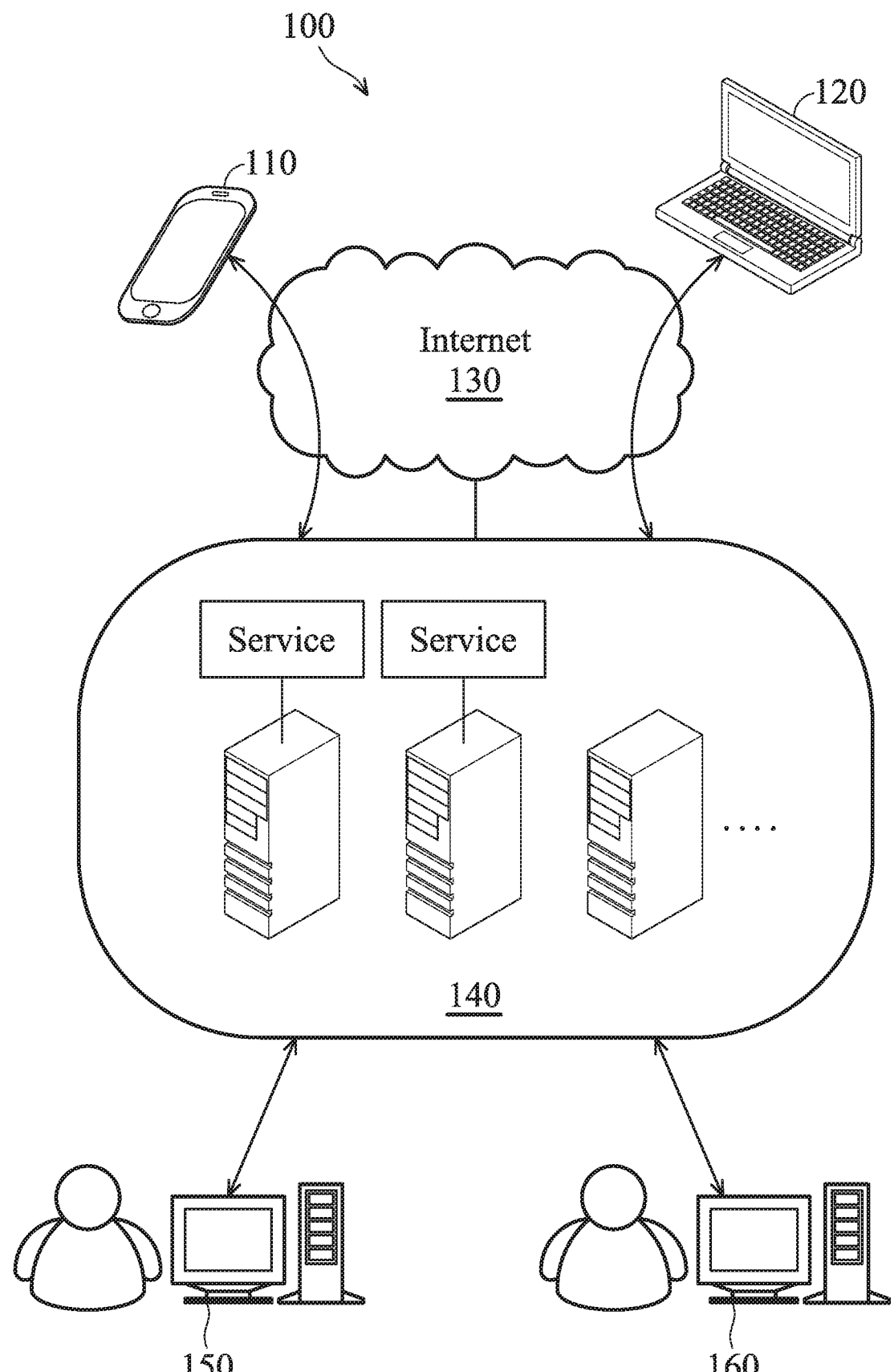
FIG. 1 is a block diagram illustrating a cloud computing environment according to an embodiment of the application.

FIG. 1 is a block diagram illustrating a cloud computing environment according to an embodiment of the application. The cloud computing environment 100 includes two user computing devices 110 and 120, the Internet 130, a cloud service system 140, a Dev computing device 150, and an Ops computing device 160.

The user computing devices 110 and 120 may connect to the cloud service system 140 via the Internet 130 for accessing cloud services, and/or the user computing devices 110 and 120 may send a deployment request to the cloud service system 140 via the Internet 130. For example, each of the user computing devices 110 and 120 may be any computing device with a network communication function, such as a laptop computer, a Personal Computer (PC), a smartphone, or a panel PC.

The cloud service system 140 may include multiple hardware resources (e.g., computers/hosts), wherein each hardware resource is installed with at least a system (including a Hypervisor, a System Center Virtual Machine Manager (SCVMM), a database, and network equipment (e.g., a firewall system, or a load balancing system)), and software containers are instantiated for cloud service execution on the hardware resources. Specifically, the hardware resources are managed by the operation team via the Ops computing device 160.

In addition, the cloud service system 140 may determine the corresponding system and version of the system according to the deployment request (e.g., a hosting request from the user computing device 110 or 120, or a system update request from the Ops computing device 160), and perform the cloud service deployment process according to the determined system and version.

In one embodiment, when the deployment request is a hosting request from the user computing device 110 or 120, the cloud service system 140 may send the link for accessing the cloud service to the user computing device 110 or 120 after completing the cloud service deployment process.

In addition, the cloud service system 140 may send a notification of the result of the cloud service deployment process to the Dev computing device 150 and/or the Ops computing device 160. For example, when there's no system of the version corresponding to the deployment request and the available systems, and versions of the current systems cannot satisfy the deployment request, the cloud service system 140 may inform the Dev computing device 150 to develop the library associated with the version indicated by the deployment request and to pack the library into an image file, and inform the Ops computing device 160 to update the supported libraries using a container engine.

Figure 2:
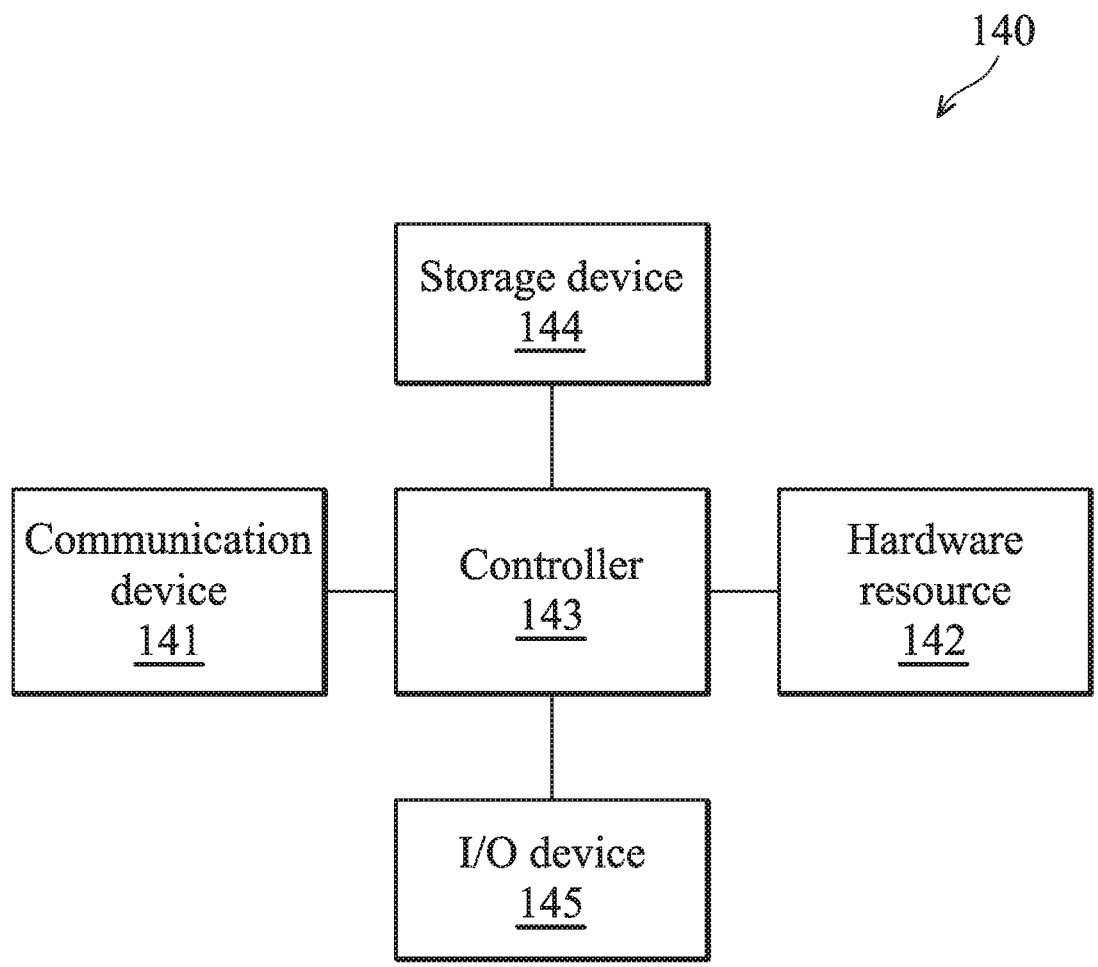
FIG. 2 is a block diagram illustrating an exemplary hardware architecture of the cloud service system 140 according to an embodiment of the application.

FIG. 2 is a block diagram illustrating an exemplary hardware architecture of the cloud service system 140 according to an embodiment of the application.

The cloud service system 140 includes a communication device 141, at least a hardware resource 142, a controller 143, a storage device 144, and an Input/Output (I/O) device 145.

The communication device 141 is responsible for providing network connections to the Internet 130 and to the user computing devices 110 and 120 via the Internet 130. The communication device 141 may provide the network connections using a wired/wireless communication technology.

The wired communication technology may include the Ethernet technology, the Asymmetric Digital Subscriber Line (ADSL) technology, the optical network technology, the twisted-pair network technology, and the coaxial cable network technology, etc.

The wireless communication technology may refer to the Wireless Local Area Network (WLAN) technology or the Wireless Wide Area Network (WWAN) technology, wherein the WLAN technology may include the Wireless Fidelity (Wi-Fi) technology, the Bluetooth technology, and the Zigbee technology, while the WWAN technology may include the Global System for Mobile communications (GSM) technology, the General Packet Radio Service (GPRS) technology, the Enhanced Data rates for Global Evolution (EDGE) technology, the Wideband Code Division Multiple Access (WCDMA) technology, the Code Division Multiple Access 2000 (CDMA-2000) technology, the Time Division-Synchronous Code Division Multiple Access (TD-SCDMA) technology, the Worldwide Interoperability for Microwave Access (WiMAX) technology, the Long Term Evolution (LTE) technology, the Time-Division LTE (TD-LTE) technology, and the LTE-Advanced (LTE-A) technology, etc.

The hardware resource 142 may be a computing host, such as a workstation (also called a cloud server), which includes basic components (e.g., a processor, a memory, and/or a hard drive) for data processing and computing. At least a software/hardware system, including a Hypervisor, a SCVMM, a database, and network equipment (e.g., a firewall system, or a load balancing system) may be instantiated based on the hardware resource 142.

The controller 143 may be a general-purpose processor, a Micro Control Unit (MCU), an Application Processor (AP), or a Digital Signal Processor (DSP), which includes various circuits for performing the functions of data processing and computing, controlling the communication device 141 to provide network connections, managing the hardware resource 142, reading or storing data from or to the storage device 144, and sending notifications or receiving deployment requests to or from the Dev computing device 150 and the Ops computing device 160 via the I/O device 145.

In particular, the controller 143 coordinates the operations of the communication device 141, the hardware resource 142, the storage device 144, and the I/O device 145, to carry out the method for cloud service provisioning using software containers.

The storage device 144 is a non-transitory computer-readable storage medium, such as a Random Access Memory (RAM), or a FLASH memory, or a magnetic storage device, such as a hard disk or a magnetic tape, or an optical disc, or any combination thereof for storing libraries associated with the supported versions of the systems installed in the hardware resource 142, and storing instructions or program code of applications and/or communication protocols. Each of the libraries is associated with a respective version of a system. For example, library-1 is associated with SCVMM of version 1.0, library-2 is associated with SCVMM of version 2.0, library-3 is associated with SCVMM of version 3.0, library-4 is associated with a database of version 1.0, library-5 is associated with the database of version 2.0, library-6 is associated with a firewall system of version 1.0, and library-7 is associated with a load balancing system of version 1.0, etc.

In particular, the storage device 144 stores instructions or program code of the method of the present application, which are loaded and executed by the controller 143.

The I/O device 145 may include one or more buttons, a keyboard, a mouse, a touch pad, a video camera, a microphone, a display device (e.g., a Liquid-Crystal Display (LCD), Light-Emitting Diode (LED) display, or Electronic Paper Display (EPD), etc.), and/or a speaker, etc., serving as the Man-Machine Interface (MMI) for interaction with users (e.g., personnel of the development team and the operation team).

It should be understood that the components described in the embodiment of FIG. 2 are for illustrative purposes only and are not intended to limit the scope of the application. For example, the cloud service system 140 may include more components, such as extra hardware resources.

Figure 3:
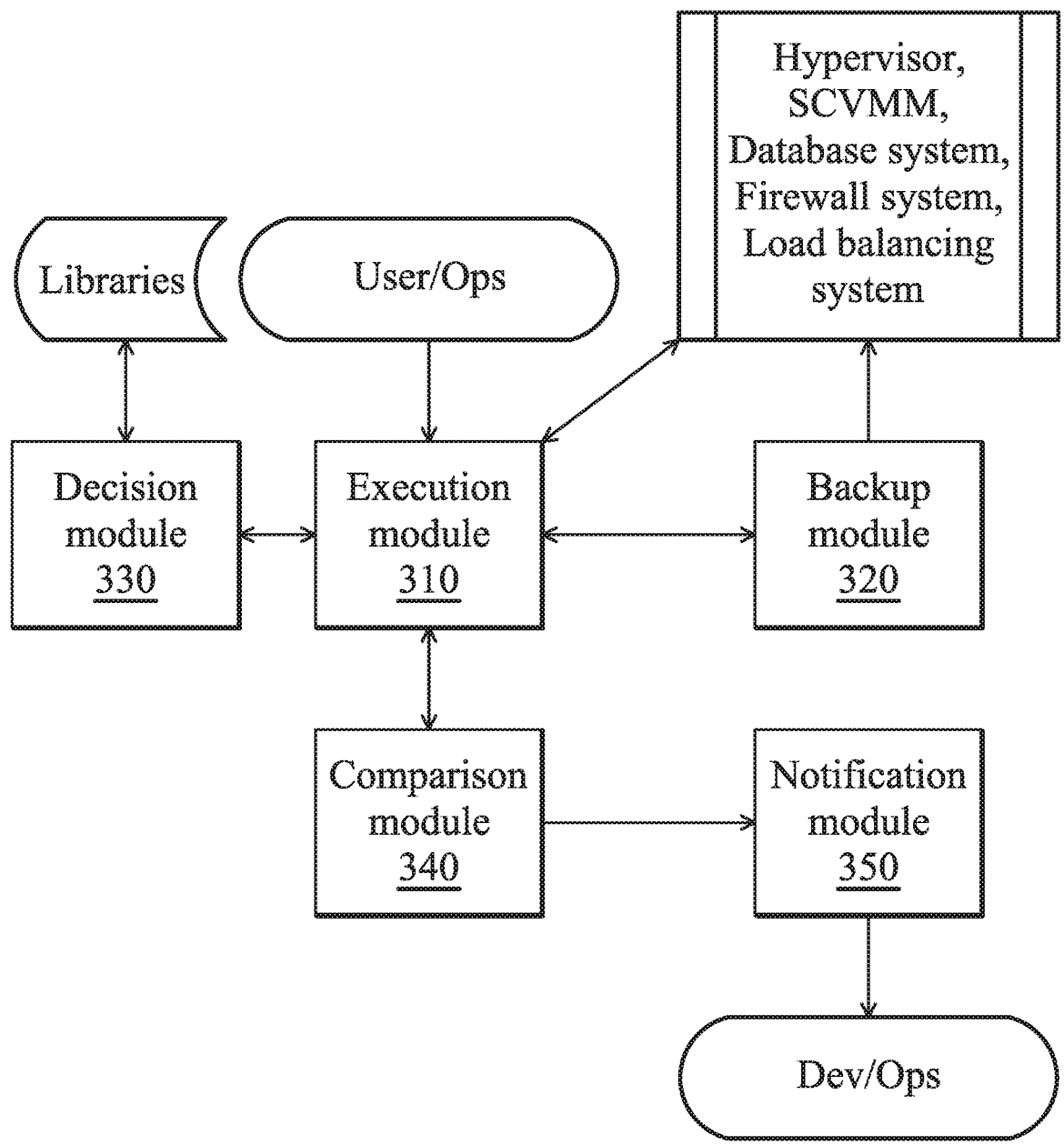
FIG. 3 is a block diagram illustrating an exemplary software architecture of the method for cloud service provisioning using software containers according to an embodiment of the application.

FIG. 3 is a block diagram illustrating an exemplary software architecture of the method for cloud service provisioning using software containers according to an embodiment of the application.

In this embodiment, the method for cloud service provisioning using software containers is executed by the cloud service system 140. Specifically, the method for cloud service provisioning using software containers may be implemented in multiple software modules which are loaded and executed by the controller 143. As shown in FIG. 3, the software architecture includes an execution module 310, a backup module 320, a decision module 330, and a comparison module 340, and a notification module 350.

The execution module 310 is responsible for providing an interface for receiving deployment request from the user computing devices 110 and 120, or from the Ops computing device 160. Also, the execution module 310 is responsible for determining corresponding system and version of the system according to the deployment request, and delivering the information of the determined system and version to the decision module 330. Next, the decision module 330 selects one of the supported libraries, which fits the deployment request, and the execution module 310 informs the backup module 320 to create a backup of the setting parameters or system configuration of the current system before deployment process. After that, the execution module 310 performs the cloud service deployment process according to the selected library retrieved by the decision module 330. That is, the selected library is used for instantiating the software container(s) for cloud service execution.

In another embodiment, if the cloud service deployment process fails, the execution module 310 may inform the decision module 330 to select another library that fits the deployment request, and re-perform the cloud service deployment process according to the newly selected library, until there's no more library that fits the deployment request. If the cloud service deployment process fails eventually, the execution module 310 may send the result of the cloud service deployment process and the information of the systems and versions that cause the failure of the cloud service deployment process to the comparison module 340. Otherwise, if the cloud service deployment process is successful, the execution module 310 may update the selection history of the supported libraries.

The backup module 320 is responsible for determining whether a backup for the setting parameters or the system configuration of the current system indicated by the execution module 310 is required. For example, when the system indicated by the execution module 310 is a database system or network equipment (e.g., a firewall system or a load balancing system), the backup module 320 creates a backup of the system running with its current system configuration.

le;.4qThe decision module 330 is responsible for looking for the libraries that fits the system and version indicated by the execution module 310. Specifically, if there is a suitable library among the supported libraries, the decision module 330 may send the suitable library to the execution module 310; otherwise, if there's no suitable library among the supported libraries, the decision module 330 may invoke a rating function (not shown) to select a library from the supported libraries according to the selection history of the supported libraries, wherein the selection history may include the information concerning the number of times each library was selected and the smallest number of days since each library was selected.

In one embodiment, the rating function may be an internal unit of the decision module 330. In another embodiment, the rating function may be implemented as a module that is independent from the decision module 330.

For example, if the deployment request indicates a load balancing system of version 4.0 and there are only libraries associated with version 1.0, 2.0, and 3.0 of the load balancing system in the supported libraries, the rating function may select a library from the supported libraries using equation (1) as follows.

$$\text{Max}\left(\frac{2}{L+1} \times \text{V1\_ratio}, \frac{2}{L+1} \times \text{V2\_ratio}, \frac{2}{L+1} \times \text{V3\_ratio}, \ldots \right) \quad (1)$$

In equation (1), V1_ratio/V2_ratio/V3_ratio represents the ratio of "the number of times the library associated with version 1.0/2.0/3.0 of the load balancing system was selected" to "the total number of days sampled in this calculation". $2/(L+1)$ is a smoothing index, wherein L represents the smallest number of days since the corresponding library was selected.

For clarification, an example of the selection history for the most recent 5 days is provided below.

TABLE 1

| Day | N-5 | N-4 | N-3 | N-2 | N-1 |
|---|---|---|---|---|---|
| version | V1.0 | V1.0 | V2.0 | V2.0 | V3.0 |

In table 1, N represents today. With the selection history shown in table 1, the rating function may calculate the score of each library as follows: the score of the library associated with version 1.0 is $$\frac{2}{5} \times \frac{2}{(4+1)} = \frac{4}{25},$$

the score of the library associated with version 2.0 is $$\frac{2}{5} \times \frac{2}{(2+1)} = \frac{4}{15},$$

and the score of the library associated with version 3.0 is $$\frac{1}{5} \times \frac{2}{(1+1)} = \frac{2}{10}.$$

Consequently, based on equation (1), the rating function will select the library associated with version 2.0.

Please note that equation (1) is designed to not simply favor selection of the library associated with the latest-selected version (e.g. version 3.0 in table 1), due to the consideration that availability may be a more important factor with respect to normal functioning of the cloud services. For example, in a cloud service system, there may be multiple computing hosts or systems with the same specification, and when the computing hosts or systems need to be updated to a newer version, a common practice would be to update only one of the computing hosts or systems to let it run for a few days and if it works normally, then to update the rest of the computing hosts or systems. Otherwise, if the first updated computing host or system malfunctions during the test days, the cloud service executed on the malfunctioning computing host or system may be transferred to another computing host or system, and the malfunctioning computing host or system may be recovered to the previous version. Therefore, the latest-selected version may not be the one with the highest availability, and this is why equation (1) includes the frequency factor (i.e., the number of times each library was selected) which has a positive correlation with availability, and the time factor (i.e., the smallest number of days since each library was selected) which may favor the latest-selected version.

The comparison module 340 is responsible for comparing the system configuration of the backup system to the system configuration of the system that is running after applying the selected library for the cloud service deployment process (i.e., comparing the system configurations of the systems running before and after applying the selected library). When the compared system configurations are different, the comparison module 340 may trigger the notification module 350 to send a notification to the Dev computing device 150 and/or the Ops computing device 160. That is, even though the cloud service deployment process is successful, the notification may serve as a reminder for the development team and/or the operation team to check on the system configuration. In addition, the comparison module 340 may receive the result of the cloud service deployment process and optionally the information of the problematic system and version from the execution module 310, and forward the received information to the notification module 350.

In one embodiment, the system configuration may include the grammar and/or parameters of the systems running before and after applying the selected library. Specifically, when the system is a load balancing system, the system configuration may include parameters, such as virtual server, port, protocol, and IP address, etc. For example, if the comparison result indicates that a parameter before applying the selected library is configured with a value but the parameter after applying the selected library is not configured (i.e., has an empty value), the comparison result may be determined to be abnormal and the aforementioned notification should be sent.

The notification module 350 is responsible for receiving information from the comparison module 340 and forwarding the received information to the Dev computing device 150 and/or the Ops computing device 160. Specifically, when the cloud service deployment process fails (i.e., there's no suitable library), the notification module 350 receives the result of the cloud service deployment process and the information of the problematic system and version from the comparison module 340, and then forwards the received information to the Dev computing device 150 and/or the Ops computing device 160, so that the operation team may manually set up the system configuration and the development team may develop a suitable library according to the information of the problematic system and version. When the suitable library has been developed, the operation team may update the supported libraries of the cloud service system. In addition, when the cloud service deployment process is successful, the notification module 350 receives information of the selected library and the system configurations of the systems running before and after applying the selected library from the comparison module 340, and then send the received information in a notification to the development team and the operation team for further confirmation.

Figure 4A:
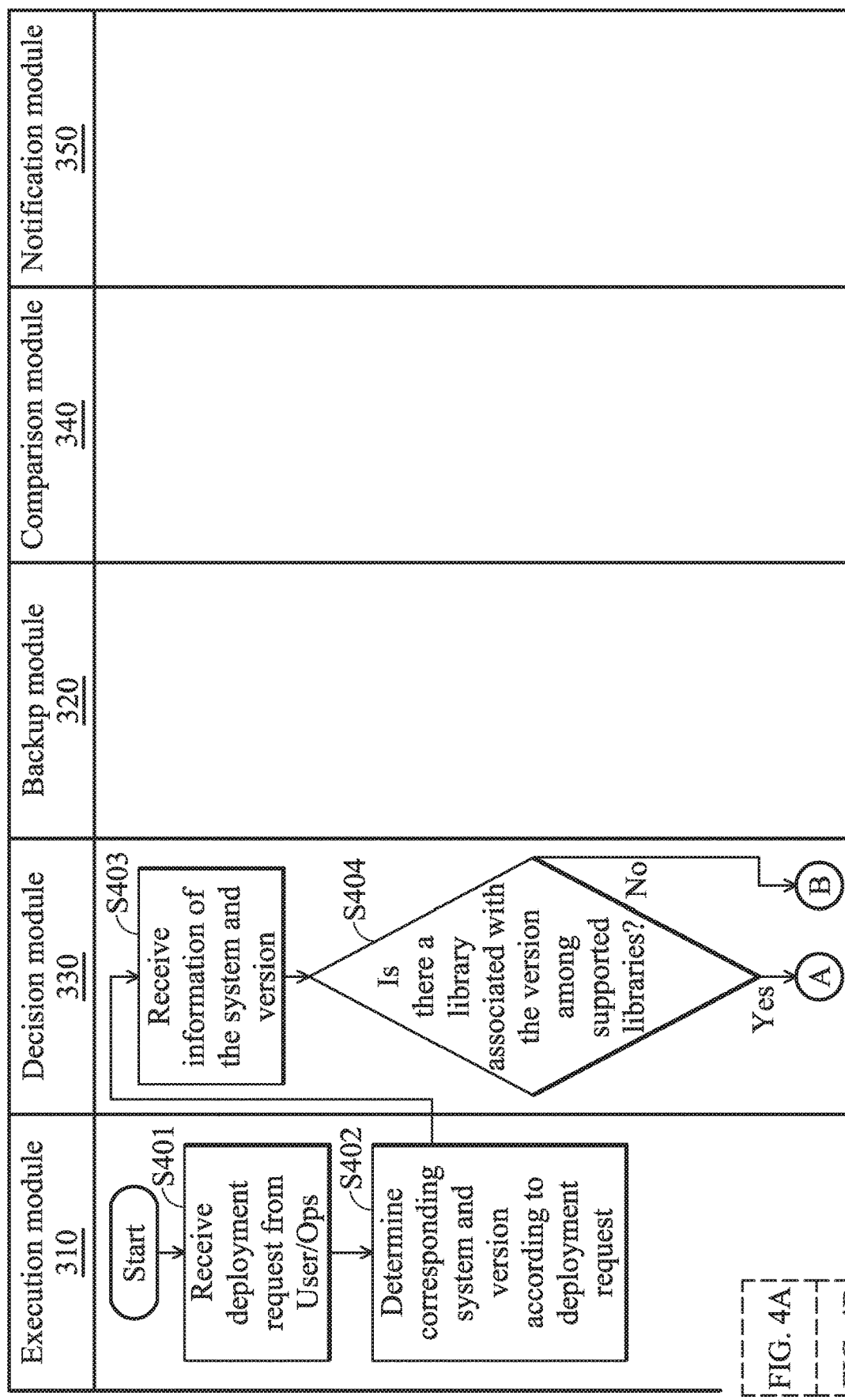
FIGS. 4A and 4B show a flow chart of the method for cloud service provisioning using software containers according to an embodiment of the application.
Figure 4B:
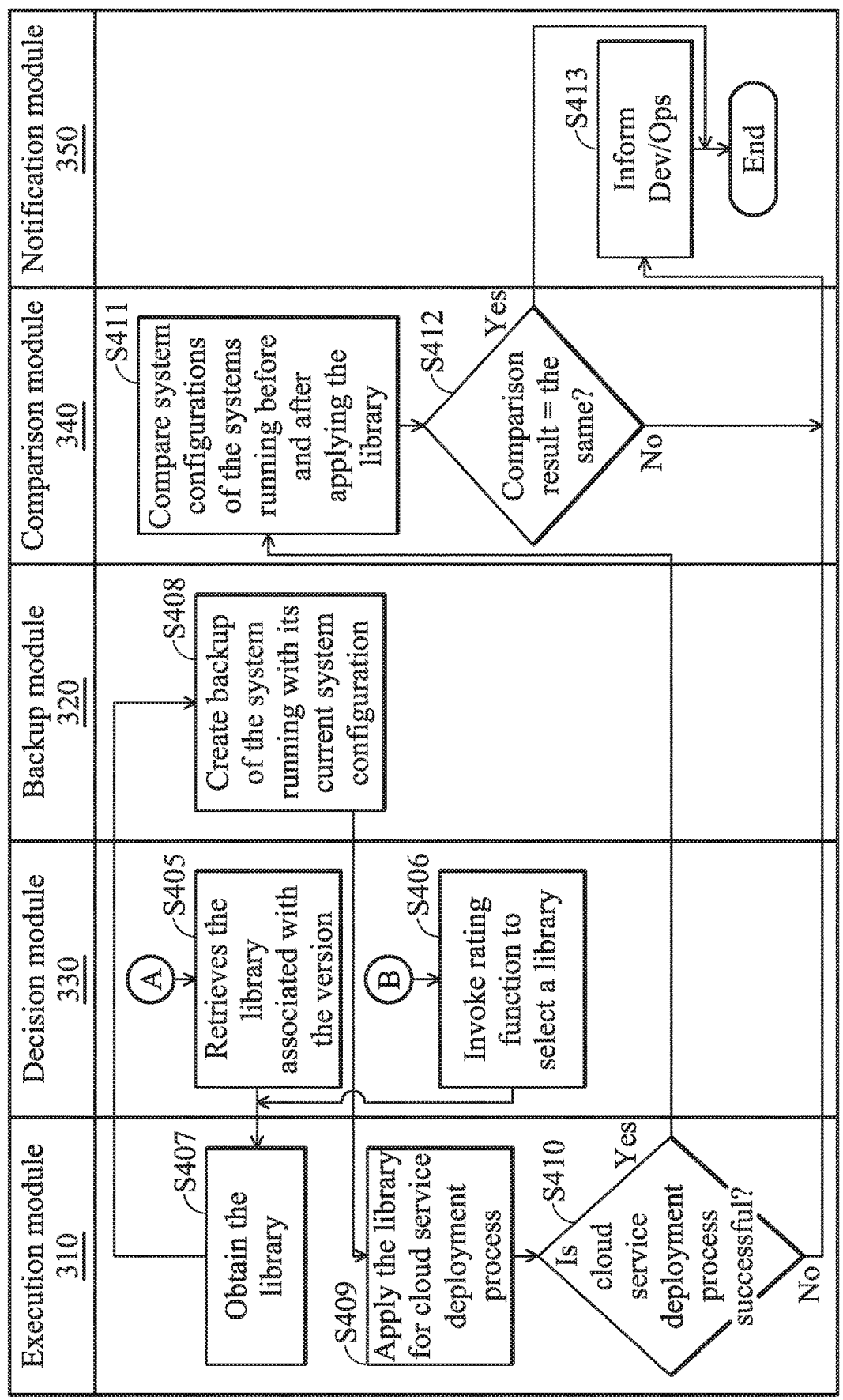

FIGS. 4A and 4B show a flow chart of the method for cloud service provisioning using software containers according to an embodiment of the application.

To begin with, the execution module 310 receives a deployment request from a user (via the user computing device 110 or 120) or from the operation team (via the Ops computing device 160) (step S401). In one embodiment, the deployment request may be a hosting request from the user for hosting a new service. In another embodiment, the deployment request may be a system update request from the operation team for updating a certain system.

Next, the execution module 310 determines the corresponding system and version of the system according to the deployment request (step S402). For example, the deployment request may be a hosting request for hosting a new service, wherein the new service requires utilization of the SCVMM of version 1.0, a firewall system of version 4.0, and a load balancing system of version 2.0. Alternatively, the deployment request may be a system update request for updating a certain system, e.g., updating the Hypervisor of version 2.0 to 3.0, or updating the database system of version 1.0 to 2.0.

Subsequently, the decision module 330 receives information of the system and version from the execution module 310 (step S403), and determines whether there is a library associated with the version among the supported libraries (step S404). If such a library exists, the decision module 330 retrieves the library and returns the library to the execution module 310 (step S405). Otherwise, if such a library does not exist, the decision module 330 invokes the rating function to select a library from the supported libraries according to the selection history of the supported libraries (step S406).

Next, the execution module 310 obtains the selected library from the decision module 330 (step S407), and informs the backup module 320 to create a backup of the system running with its current system configuration (step S408).

After that, the execution module 310 applies the selected library for the cloud service deployment process (step S409). That is, the selected library is used for instantiating the software container(s) for cloud service execution.

Next, the execution module 310 determines whether the cloud service deployment process is successful (step S410), and if so, instructs the comparison module 340 to compare the system configurations of the systems running before and after applying the selected library (step S411).

In one embodiment, the cloud service deployment process is considered to be successful if the execution module 310 does not return the result of the cloud service deployment process.

Subsequent to step S411, the comparison module 340 determines whether the comparison result indicates that the compared system configurations are the same (step S412), and if so, then there's no need to inform the manager (e.g., the development team and/or the operation team) of the cloud service system, and the method ends. Otherwise, if the comparison result indicates that the compared system configurations are different, the comparison module 340 instructs the notification module 350 to send a notification to the manager (e.g., the development team and/or the operation team) of the cloud service system for further confirmation (step S413), and the method ends. The notification may include information concerning the selected library and the system configurations of the systems running before and after applying the selected library.

Subsequent to step S410, if the cloud service deployment process fails, the method proceeds to step S413 where the notification module 350 may send a notification to the manager, wherein the notification may include the information concerning the result of the cloud service deployment process and the problematic system and version.

In view of the foregoing embodiments, it will be appreciated that the systems and methods for cloud service provisioning using software containers are characterized by using the software containers to modularize the systems of different versions and using a respective library to store the kernel of each system. Advantageously, the efficiency of system updates may be significantly improved. As to the situations where the version of system in the deployment request is not supported, the present application proposes to select a suitable library from the currently supported libraries according to the selection history of the currently supported libraries, and to apply the selected library for the cloud service deployment process. Advantageously, the loading of the development team and the operation team may be significantly reduced, and the deployment frequency and cloud service maintenance of the cloud service system may be improved.

While the application has been described by way of example and in terms of preferred embodiment, it should be understood that the application cannot be limited thereto. Those who are skilled in this technology can still make various alterations and modifications without departing from the scope and spirit of this application. Therefore, the scope of the present application shall be defined and protected by the following claims and their equivalents.

Note that use of ordinal terms such as "first", "second", etc., in the claims to modify a claim element does not by itself connote any priority, precedence, or order of one claim element over another or the temporal order in which acts of the method are performed, but are used merely as labels to distinguish one claim element having a certain name from another element having the same name (except for use of ordinal terms), to distinguish the claim elements.

What is claimed is:

1. A cloud service system, comprising:
  a hardware resource, installed with a system, wherein a software container is instantiated for cloud service execution on the hardware resource;
  a storage device, configured to store a plurality of libraries, each of which is associated with a respective version of the system; and
  a controller, configured to determine a first version of the system according to a deployment request, determine whether one of the libraries is associated with the first version, and select one of the libraries for instantiating the software container according to a selection history of the libraries in response to none of the libraries being associated with the first version, wherein the selection history comprises information concerning the number of times each library was selected and the smallest number of days since each library was selected.

2. The cloud service system of claim 1, wherein, in response to one of the libraries being associated with the first version, the controller is further configured to select the library associated with the first version for instantiating the software container.

3. The cloud service system of claim 1, wherein the controller is further configured to create a backup of the system running with a first system configuration, prior to instantiating the software container on the hardware resource.

4. The cloud service system of claim 3, wherein, subsequent to instantiating the software container on the hardware resource, the controller is further configured to determine a second system configuration with which the system is running, and send a notification in response to the first system configuration being different from the second system configuration.

5. A method for cloud service provisioning using software containers, executed by a cloud service system, the method comprising:
  providing a hardware resource installed with a system, wherein a software container is instantiated for cloud service execution on the hardware resource;
  determining a first version of the system according to a deployment request;
  determining whether one of a plurality of libraries is associated with the first version; and
  selecting one of the libraries for instantiating the software container according to a selection history of the libraries in response to none of the libraries being associated with the first version, wherein the selection history comprises information concerning the number of times each library was selected and the smallest number of days since each library was selected.

6. The method of claim 5, further comprising:
  in response to one of the libraries being associated with the first version, selecting the library associated with the first version for instantiating the software container.

7. The method of claim 5, further comprising:
prior to instantiating the software container on the hardware resource, creating a backup of the system running with a first system configuration.

8. The method of claim 7, further comprising:
subsequent to instantiating the software container on the hardware resource, determining a second system configuration with which the system is running, and sending a notification in response to the first system configuration being different from the second system configuration.

* * * * *